United States Patent [19]
Anzai

[11] Patent Number: 5,113,826
[45] Date of Patent: May 19, 1992

[54] INTAKE AIR CONTROL SYSTEM FOR INTERNAL COMBUSTION ENGINE

[75] Inventor: Makoto Anzai, Yokosuka, Japan

[73] Assignee: Nissan Motor Co., Ltd., Yokohama, Japan

[21] Appl. No.: 704,527

[22] Filed: May 24, 1991

[30] Foreign Application Priority Data

May 30, 1990 [JP] Japan .................................. 2-138611

[51] Int. Cl.$^5$ .............................................. F02B 29/00
[52] U.S. Cl. ................................ 123/403; 123/52 MB
[58] Field of Search .................. 123/403, 405, 52 MB, 123/52 MF, 399

[56] References Cited
U.S. PATENT DOCUMENTS 4,461,151 7/1984 Kanesaka ........................ 123/405 X
4,738,233 4/1988 Hitoni et al. .............. 123/52 MB X

OTHER PUBLICATIONS

Lenz et al., "Variable Valve Timing—A Possibility to Control Engine Load without Throttle," SAE Technical Paper Series 880388, 1988, pp. 1–7.

*Primary Examiner*—Tony M. Argenbright
*Attorney, Agent, or Firm*—Foley & Lardner

[57] ABSTRACT

An intake air control system for a multi-cylinder reciprocating internal combustion engine. The intake system is comprised of a plurality of intake air passages which are respectively communicable with a plurality of combustion chambers each defined in each engine cylinder. A communication passage is contained with each intake air passage to establish communication between upstream and downstream sides of a throttle valve disposed in each intake air passageway. A bypass valve is disposed in each communication passage to control the flow amount of air flowing through the communication passage, in accordance with an output torque in each cylinder. The opening degree of the throttle valve is controlled in accordance with a target opening degree set in accordance with a depression angle of an accelerator pedal. The maximum value of opening degree of the throttle valve is restricted to the level of a limited maximum opening degree (set in accordance with engine speed) at which a pressure in the combustion chamber is approximately the maximum when an intake valve is closing, thereby suppressing the amount of air which reversely flows through the throttle valve.

10 Claims, 5 Drawing Sheets

INTAKE AIR CONTROL SYSTEM FOR INTERNAL COMBUSTION ENGINE

BACKGROUND OF THE INVENTION

1. Field of the Invention

This invention relates to improvements in an intake air control system for an internal combustion engine, and more particularly to a control system arranged to prevent degradation in output torque at a high opening degree of a throttle valve while maintaining a high output torque in a low load engine operation.

2. Description of the Prior Art

A variety of intake air control systems for an internal combustion engine have hitherto been proposed and put into practical use. One of them is disclosed in SAE Technical Paper Series No. 880388. FIG. 2 of this SAE Paper Series shows an engine intake air control system in which a rotary slide valve is disposed in an intake air passage upstream of an intake valve. The rotary slide valve is arranged to be opened in timed relation to the opening and closing operations of the intake valve so that air is sucked into a combustion chamber under the descending of a piston during an opening overlap of the rotary slide valve and the intake valve. Here, the pressure prevailing in the intake air passage becomes the level of atmospheric pressure at the initial stage of the opening of the intake valve under the effect of the rotary slide valve, thus reducing pumping loss of an engine.

Additionally, FIG. 9 of the SAE Paper series shows an engine intake air control system in which a throttle valve is diposed in the intake air passage upstream of the rotary slide valve, in which the pressure in the intake air passage is previously lowered below atmospheric pressure by throttling air flow with the throttle valve. As a result, the combustion chamber pressure at the bottom dead center of the piston can be set, for example, at −550 mmHg during idling operation, thereby controlling the intake air amount to be supplied to the combustion chamber. Another example of a similar engine intake air control system is disclosed in Japanese Patent Provisional Publication No. 55-148932 in which a rotary valve is disposed in an intake air passage upstream of an intake valve.

However, difficulties have been encountered in the above-discussed conventional intake air control systems. That is to say, since the rotary slide valve is disposed in series with the intake valve, a complicated gear mechanism made up of a plurality of gears is required to vary the rotational phase of the rotary slide valve. This increases friction loss and therefore totally degrades the reduction effect of pumping loss. Additionally, it is difficult to control the intake air amount for each engine cylinder by such a complicated gear mechanism.

SUMMARY OF THE INVENTION

It is therefore an object of the present invention to provide an improved intake air control system for an internal combustion engine, by which difficulties encountered in the conventional intake air control systems can be effectively overcome.

Another object of the present invention is to provide an improved intake air control system for an internal combustion engine, which is sufficiently simple in construction and can appropriately maintain an output torque of the engine while preventing degradation in output torque of the engine at a high opening degree of a throttle valve.

The intake air control system 10 of the present invention is for an internal combustion engine 12 and shown in FIG. 1 in its principle. The intake air control system 10 is comprised of a plurality of intake air passages 14 which are respectively communicable with a plurality of combustion chambers 12$b$ each defined in an engine cylinder 12$a$ of the engine. Intake air flows through each intake air passage to be supplied to the corresponding combustion chamber. A plurality of first control valves 18 are provided such that each control valvet is movably disposed in each intake iar passage to control a flow amount of intake air in each intake air passage. A plurality of communication passages 20 are provided such that each passage is connected with the intake air passage upstream of the corresponding first control valve. Air flowing through each communication passage is supplied to the corresponding intake air passage. A plurality of second control valves 22$a$ are provided such that each valve is disposed in each communication passage to control a flow amount of air flowing in each communication passage. Each second control valve is controllably operated by a device A and in accordance with at least one engine operating parameter in connection with the corresponding cylinder. A device B is provided to detect an engine speed of the engine. A device C is provided to set a limited maximum opening degree of each first control valve in accordance with the detected engine speed at which degree a pressure in the corresponding combustion chamber is approximately the maximum at a timing befor an expansion stroke of the corresponding cylinder. Additionally, a device D is provided to restrict a maximum value of opening degree of each first control valve in accordance with said limited maximum opening degree.

As discussed above, the second control valve is disposed in the communication passage in communication with the intake air passage which is formed for each engine cylinder, so that air flows through the second control valve to be supplied to the intake air passage thereby raising the intake air pressure in a small volume part of the intake air passage between the first control valve (throttle valve) and the intake valve for a duration between the closing and opening timings of the intake valve. This causes the intake pressure in the intake air passage to approach the level of atmospheric pressure at a timing of opening of the intake valve, thereby greatly reducing pumping loss of the engine with a simple arrangement. Additionally, output torque of the engine during a low load engine operation is improved, making it possible to control the intake air amount for each engine cylinder.

In addition, the maximum level of opening degree of the first control valve is restricted to the limited maximum opening degree set in accordance with engine speed, thereby suppressing the opening degree of the first control valve. As a result, the intake air pressure in the combustion chamber is prevented from lowering due to air reverse flow through the first control valve, thus avoiding degradation in output torque of the engine.

DETAILED DESCRIPTION OF THE INVENTION

Figure 1:
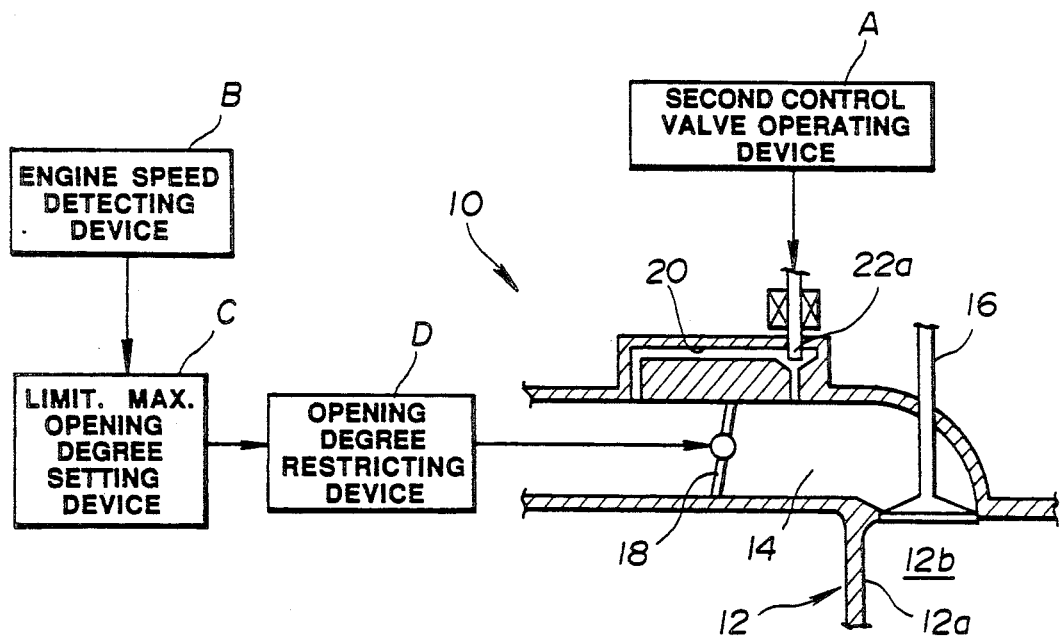
FIG. 1 is a schematic diagram showing the priciple of an intake air control system in accordance with the present invention.
Figure 2:
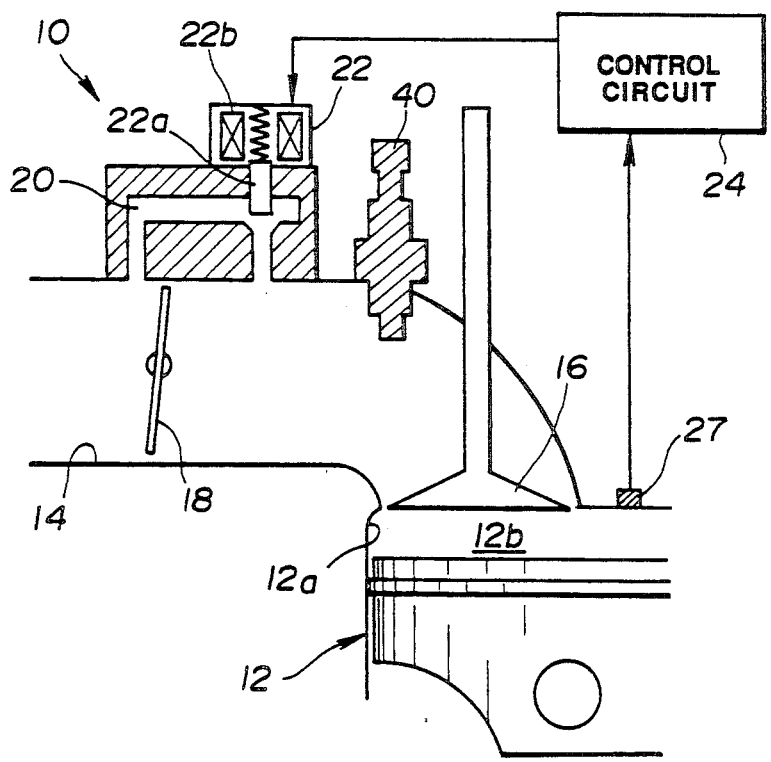
FIG. 2 is a schematic illustration of an essential part of an embodiment of the intake air control system in accordance with the present invention.
Figure 3:
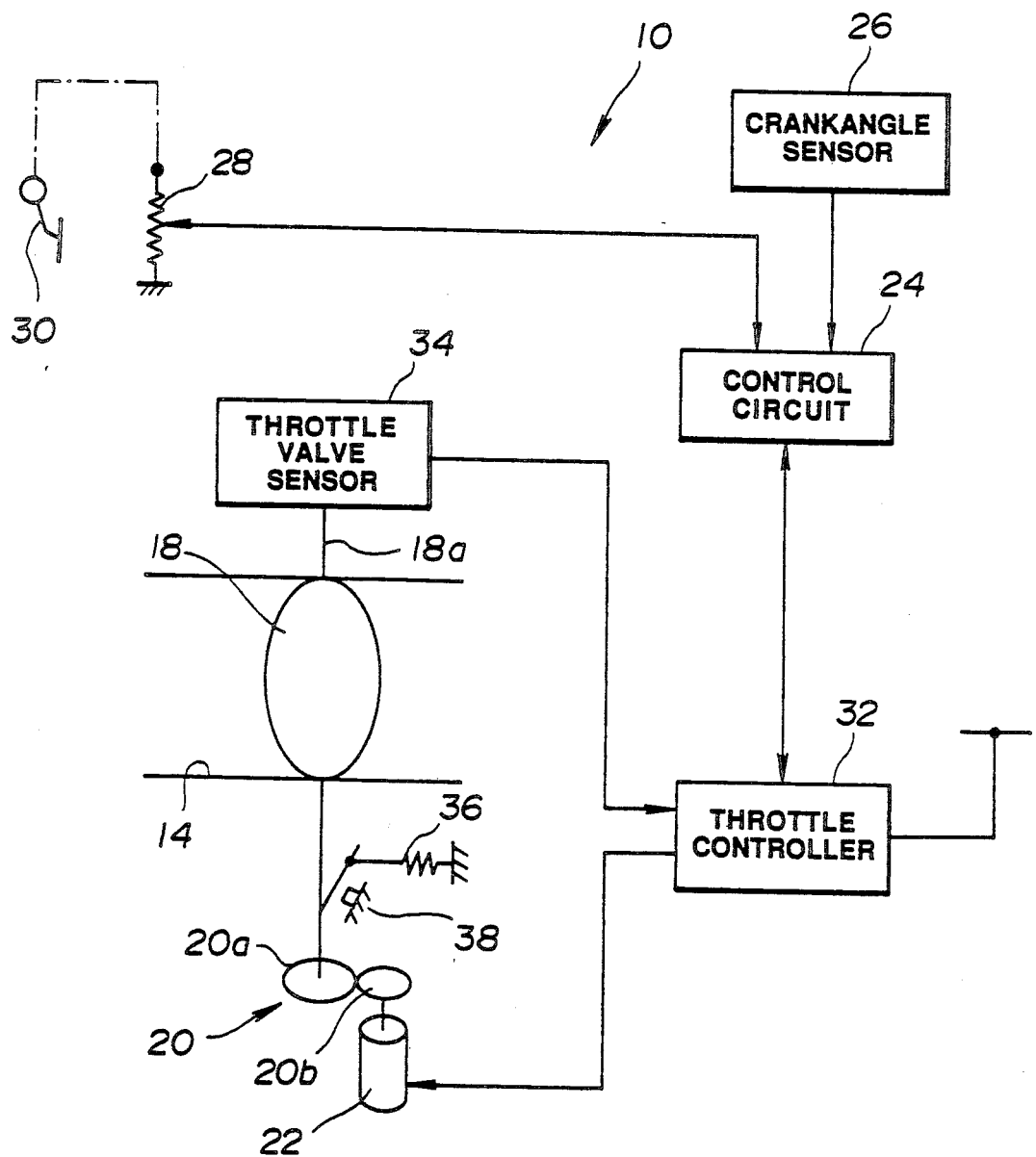
FIG. 3 is a schematic illustration showing a whole arrangement of the intake air control system of FIG. 2.

Referring now to FIGS. 2 and 3 of the drawings, an embodiment of an intake air control system of the present invention is illustrated by the reference numeral 10. The intake air control system 10 is for a reciprocating multi-cylinder internal combustion engine 12 which is, in this embodiment, mounted on an automotive vehicle (not shown). The engine 12 has a plurality of cylinders 12a (only one cylinder shown in FIG. 2) in which a combustion chamber 12b is defined between the top of the cylinder 12a and the top of a piston.

The engine 12 is provided with a plurality of intake air passages 14 each of which is communicable through an intake valve 16 with each cylinder 12 and accordingly with each combustion chamber 12b. An end of the intake air passage 14 is defined by the intake valve 16. It will be understood that intake air flows through the intake air passage 14 to be supplied into the cylinder 12. A butterfly or throttle valve (first control valve) 18 is rotatably disposed in each intake air passage 14 upstream of the intake valve 16 and in series with the intake valve 16 to control the amount of intake air flowing through the intake air passage 14. Thus, a plurality of throttle valves 18 are respectively disposed in the plurality of intake air passages 14.

A bypass or communication passage 20 is so formed as to establish communication between two portions of the intake air passage 14 upstream and downstream sides of the throttle valve 18 in the intake air passage 14. In other words, the bypass passage 20 has one end connected with the intake air passage 14 upstream of the throttle valve 18 and the other end connected with the intake air passage 14 downstream of the throttle valve 18. A plurality of bypass passages 20 are formed to be communicable respectively with the plurality of intake air passages 14. A bypass valve (second control valve) 22a forming part of a valve assembly 22 is movably disposed in each bypass passage 20 and operated by an electromagnetic actuator 22b. The opening degree of the bypass valve 22a is controlled through the electromagnetic actuator 22b in response to an electric signal supplied from a control circuit 24. Here, the volume of the intake air passage 14 between the throttle valve 18 and the intake valve 16 is set about ½ or less of the maximum volume of the combustion chamber 12b which maximum volume is a volume of the combustion chamber 12b defined by the piston 12c at the bottom dead center.

As shown in FIG. 3, the control circuit 24 is supplied with an reference signal and a position signal from a crank angle sensor 26. The reference signal is generated at every crank angle of 180 degrees of a crankshaft (not shown) of the engine. The position signal is generated at every crank angle of 1 degree. The control circuit 24 is further supplied with a cylinder pressure signal from a cylinder pressure sensor 27 embedded in a washer section (not shown) for a spark plug (not shown) projected in the combustion chamber 12b. An acceleration sensor 28 is provided to detect a depression angle or amount of an accelerator pedal 30 and generate an accelerator pedal depression angle signal representative of the depression angle.

The throttle valve 18 is fixedly mounted on a valve shaft 18A whose one end section is fixedly provided with a speed changing gear 20a. The gear 20a is meshed with another speed changing gear 20b mounted on the drive shaft of a motor 22. Thus, the throttle valve 18 is operated to open and close under the action of the motor 22. The operation of the motor 22 is controlled under the action of a throttle control signal from a throttle controller 32. The throttle controller 32 is supplied with a throttle position signal from a throttle valve sensor 34 which throttle position signal represents the throttle position (throttle valve opening degree) of the throttle valve 18.

The throttle controller 32 is supplied with either one of a signal repersentative of a target opening degree (throttle position) of the throttle valve 18 and a signal representative of a limited maximum opening degree (throttle position) of the throttle valve 18, under a mutual electrical communication between the throttle controller 32 and the control circuit 24. The target opening degree corresponds to the depression angle of the accelerator pedal 30, and therefore the target opening degree signal is generated in response to the above-mentioned acceleration pedal depression angle signal from the acceleration sensor 28. The limited maximum opening degree will be discussed in detail later. Here, the throttle controller 32 is adapted to rotate the motor 22 in such a manner as to cause the throttle valve 18 to take either one of the target opening degree and the limited maximum opening degree, under a feedback control made between it and the throttle valve sensor 34.

A return spring 36 is provided to be connected with the valve shaft 18a of the throttle valve 18 in such a manner as to bias the throttle valve 18 in a closing direction to block the intake air passage 14. The fully closed position of the throttle valve 18 is set under the action of a stopper 38. The reference numeral 40 in FIG. 2 denotes a fuel injector which injects fuel into each intake air passage 14.

The manner of operation of the intake air control system 10 will be discussed hereinafter.

First, the control of the bypass valve 22a will be explained. The pressures (combustion chamber pressures) within the respective combustion chambers 12b are detected a plurality of times (for example, four times) by the cylinder pressure sensors 27. In other words, the combustion chamber pressure is detected for each combustion chamber 12b by using the cylinder pressure sensor disposed for each cylinder 12. Then, the detected plural combustion chamber pressures for each cylinder 12 are averaged to obtain an average combustion chamber pressure for each combustion chamber 12b.

Thereafter, the average combustion chamber pressures for the respective cylinders 12 are further averaged to obtain an over-all average combustion chamber pressure. The average combustion chamber pressure for each cylinder 12 is subtracted from the over-all average combustion chamber pressure thereby to obtain a difference or deviation for each cylinder 12. In accordance with this deviation, the control circuit 24 calculates control values for respective cylinders 12 such that the generally same output torque is developed in the respective cylinders 12. The control circuit 24 outputs signals representative of the control values to the respective electromagnetic actuators 22b of the corresponding cylinders 12, thus controlling the opening degrees of respective bypass valves 22a.

The opening degree variation of the bypass valve 22a under the above control will be explained with reference to a timing chart of FIG. 4. Here, an exemplification will be made on an idling operation in which the throttle valve is fully closed. In the timing chart of FIG. 4, "INTAKE" represents an intake stroke of a power production cycle of the engine, "COMPRESS." a compression stroke, "POWER" a power stroke, and "EXHAUST" an exhaust stroke.

Figure 4:
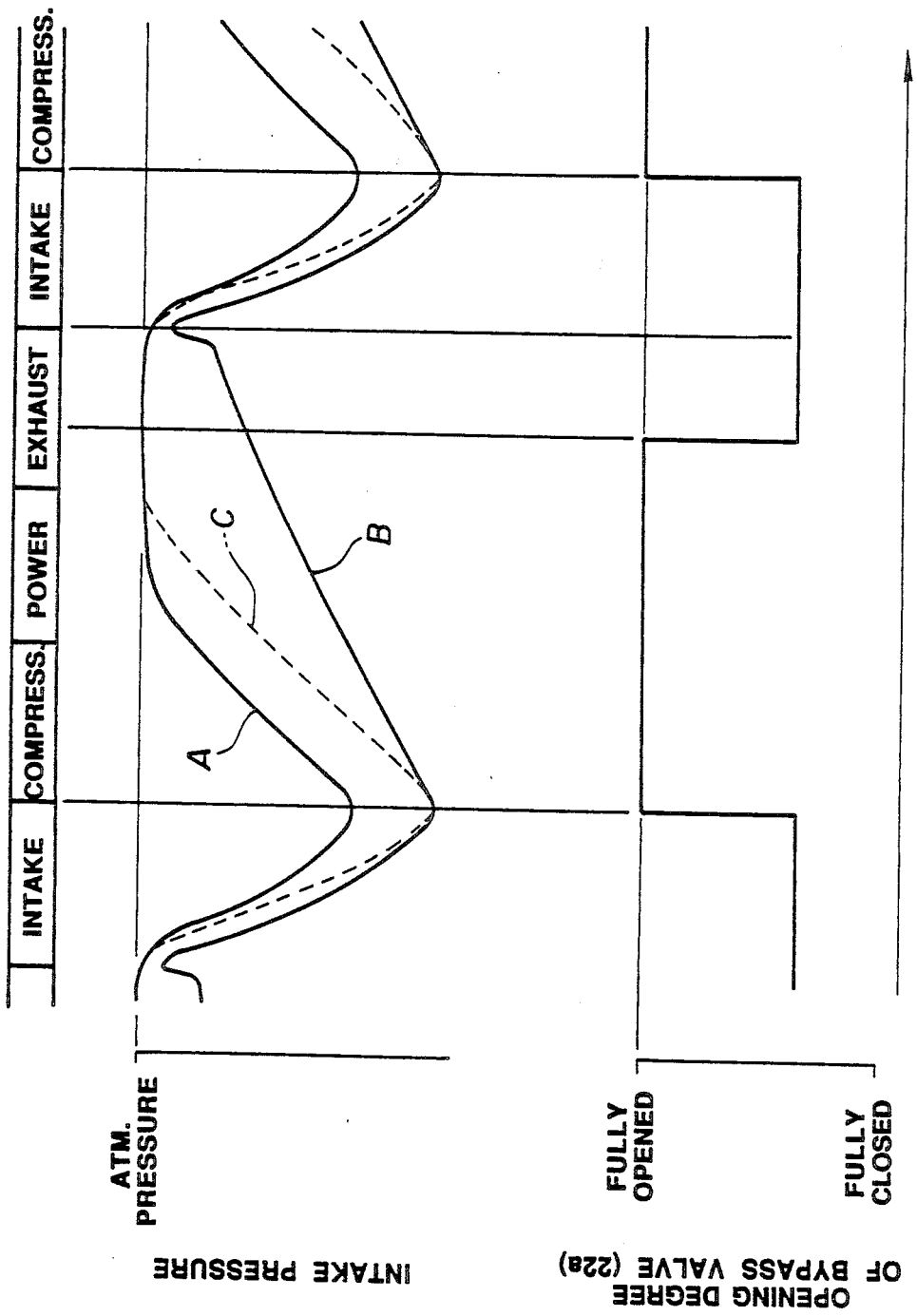
FIG. 4 is a timing chart showing operation of the intake air control system of FIG. 2, in terms of intake air pressure and opening degree of a bypass valve.

As clearly seen in FIG. 4, in this embodiment, the bypass valve 22a is fully opened on the compression and power strokes so that the intake pressure in the intake air passage 14 downstream of the throttle valve 18 becomes the level of atmospheric pressure at the initial stage of the intake stroke at which the intake valve 16 begins to open. As a result, the intake pressure downstream of the throttle valve 18 changes as indicated by a dotted curve C in FIG. 4 in which the intake pressure (at the terminal stage of intake stroke and, for example, $-550$ to $-570$ mmHg during idling operation) at the bottom dead center of the piston on the intake stroke rises to a level near atmospheric pressure.

Otherwise, if the bypass valve 22a is so opened as to always maintain a predetermined opening degree in order that the intake pressure at the initial stage of the intake stroke becomes the level of the atmospheric pressure, the intake pressure changes as indicated by a solid curve A in FIG. 4 in which the intake pressure at the bottom dead center of the piston cannot sufficiently drop, thereby increasing the intake air amount over a target level. If the opening degree of the bypass valve 22a is so set smaller that the intake pressure at the bottom dead center of the piston becomes the above-mentioned level of $-550$ to $-570$ mmHg, the intake pressure at the initial stage of the intake stroke cannot reach the level of atmospheric air as indicated by a solid curve B.

In this embodiment, at the timing of opening of the intake valve 16, the bypass valve 22a is closed from the above-mentioned fully opened state in such a manner that the opening degree of the bypass valve 22a is minimized to a predetermined value. As a result, the intake pressure at the opening timing of the intake valve 16 is set at the level near atmospheric pressure, while the intake pressure at the terminal stage of the intake stroke is set at the predetermined level, thus making it possible to set the intake air amount to a predetermined value. More specifically, in this embodiment, the bypass valve 22a is fully opened when the intake valve 16 is closing, and closed to the predetermined opening degree immediately before the intake valve 16 opens. According to this control manner, the opening degree of the bypass valve 22a can be controlled simply in proportion to engine speed of the engine 12. That is to say, assuming the intake pressure at the initial stage of the intake stroke is the level of atmospheric pressure, the flow amount of intake air to be supplied to the engine can be obtained from the ratio between the volume of the intake air passage 14 downstream of the throttle valve 18 and the volume of the combustion chamber 12b which volume increases with the descending of the piston 12c, in which it is sufficient to supply a shortage amount of air upon opening the control of the bypass valve 22a.

In FIG. 4, the closing timing of bypass valve 22a is set before the initiation of the intake stroke (or on the exhaust stroke). This is because a response delay in the control system is taken into consideration. In practice, the bypass valve 22a is closed to the predetermined opening degree immediately before the intake valve 16 opens. It will be understood that the air flow amount in the bypass passage 20 may be controlled in the above-mentioned manner under control of the electromagnetic actuator 22b by using signals having various ON-OFF duty ratios.

Next, a control of the opening degree of the throttle valve 18 will be explained with reference to a flowchart in FIG. 5. The control circuit 24 sets the target throttle opening degree in response to the signal representative of the depression angle of the accelerator pedal 30, from the acceleration sensor 28. The signal representative of the target throttle opening degree is output to the throttle controller 32. Then, the throttle controller 32 controls the motor 22 to cause the throttle valve 18 to take the target throttle opening degree, in accordance with the throttle position signal from the throttle valve sensor 34.

Figure 5:
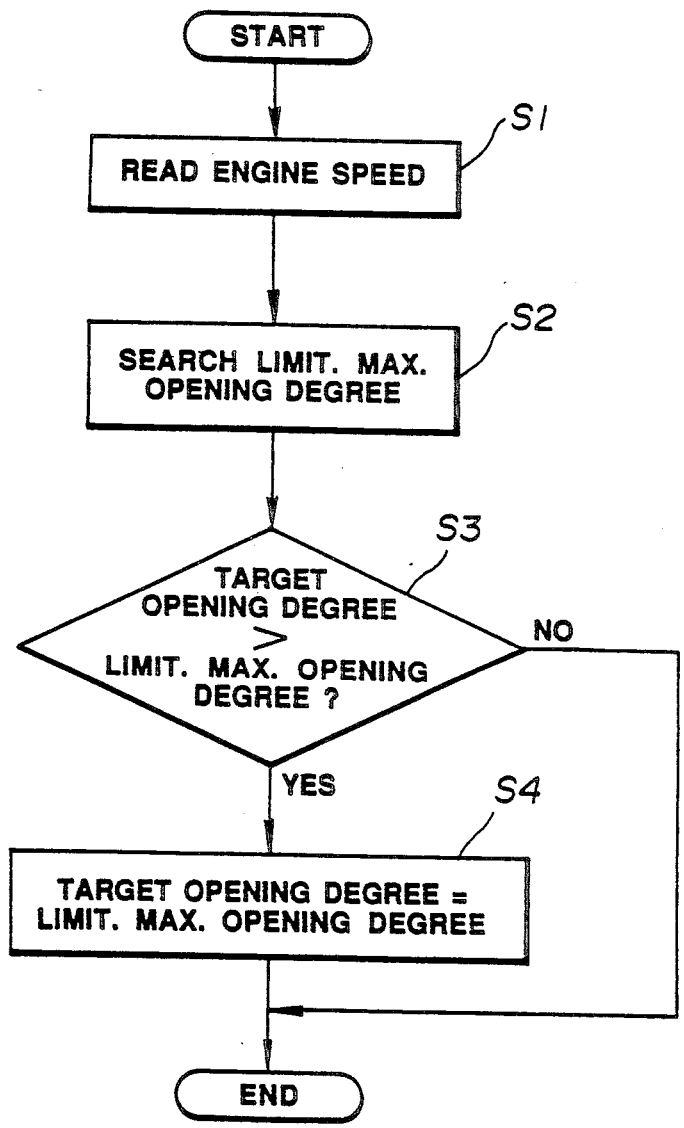
FIG. 5 is a flow chart showing the control of a throttle valve of the intake air control system of FIG. 2.
Figure 6:
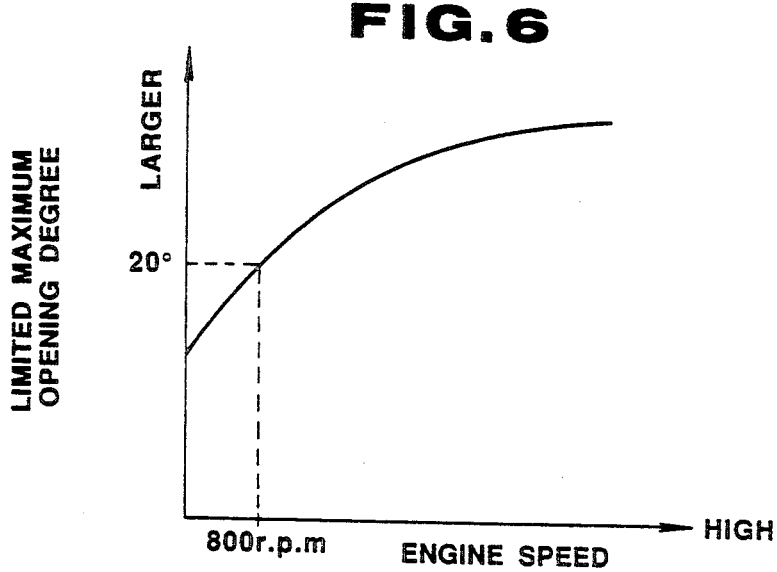
FIG. 6 is a graph showing the relationship between a limited maximum opening degree and engine speed, used in the control of the intake air control system of FIG. 2.

In this control, a routine of the flowchart shown in FIG. 5 is executed, for example, at every 10 msec in the control circuit 24. At a step S1, an engine speed is read in accordance with the signals from the crank angle sensor 26. At a step S2, the limited maximum opening degree is searched from a control map (not shown) in accordance with the engine speed read. The limited maximum opening degree is an opening degree of the throttle valve 18 and increases as engine speed increases. The limited maximum opening degree is a value at which the pressure in the combustion chamber 12b becomes the maximum when the intake valve 16 is closing, in case the opening degree of the throttle valve 18 is being varied under a condition in which engine speed is constant.

At a step S3, a judgement is made as to whether the target opening degree of the throttle valve 18 exceeds the limited maximum opening degree. When the target opening degree exceeds the limited maximum opening degree, the routine goes to a step S4. When it does not exceed the limited maximum opening degree, the routine is terminated. At the step S4, the target opening degree is set at the limited maximum opening degree, and the signal representative of the limited maximum opening degree is output from the control circuit 24 to the throttle controller 32.

As a result of the above control, the throttle controller 32 controls the motor 22 to maintain the maximum opening degree of the throttle valve 18 at the value of the limited maximum opening degree even if the depression angle of the accelerator pedal 30 further increases (i.e., regardless of the depression angle of the accelerator pedal) under a feedback control in accordance with the throttle position signal from the throttle valve sensor 34.

The advantageous effects of the intake air control system of this embodiment will be discussed in detail hereinafter.

By virtue of the bypass valves 22a disposed for the respective engine cylinders 12a, the pressure in the combustion chamber 12b (about the same as intake pressure in the intake air passage 14) is maintained at the level near atmospheric pressure when the intake valve 16 begins to open. Accordingly, the combustion chamber pressure straightly drops from the level of atomospheric pressure to the level of the combustion chamber pressure (for example, −550 to −570 mmHg) at the bottom dead center of the piston during idling operation as the piston 12c descends. This largely decreases a pumping loss as compared with conventional intake system in which intake air is controlled only by throttle valves disposed for respective engine cylinders, while greatly improving power output of the engine. Additionally, the bypass valves 22a are of the type operated by the electromagnetic actuator 22b and therefore simple in construction and arrangement as compared with conventional similar intake air control systems.

Here, the reason why the intake air passage 14 between the throttle valve 18 and the intake valve 16 is set about ½ or less of the maximum volume of the combustion chamber 12b will be explained on the assumption that the maximum volume of the combustion chamber 12b is A; the volume of the intake air passage 14 between the throttle valve 18 and the intake valve 16 is B; the compression ratio of the engine is 1/10; the pressure (intake pressure) in the combustion chamber 12b at the bottom dead center of the piston during idling operation is −456 mmHg (in a high engine speed type engine having a relatively long valve overlap duration).

That is to say, the total volume of the intake air passage and the combustion chamber at the top dead center of the piston is $(A/10+B)$, whereas the total volume of the intake air passage and the combustion chamber at the bottom dead center of the piston is $(A+B)$. In this state, when the combustion chamber pressure and the intake pressure change from the level of atmospheric pressure (1 atm) to −450 mmHg (0.4 atm), the following equation is established: $(A/10+B)/(A+B)=0.4$, from which $A=2B$ is derived. Consequently, when the volume of the intake air passage 14 between the throttle valve 18 and the intake valve 16 is about ½ or less of the maximum volume of the combustion chamber, an appropriate combustion chamber pressure at the piston bottom dead center can be obtained during a low load engine operation such as the idling operation.

Additionally, since the deviation of the average combustion chamber pressure from the over-all average combustion chamber pressure is obtained for each cylinder, the combustion chamber pressure in each cylinder approaches the over-all average combustion chamber pressure, thereby rendering the combustion chamber pressures in the respective cylinders generally the same. As a result, the output torques in the respective cylinders are made generally the same, thereby stabilizing drivability during idling operation.

Furthermore, since the control value for the electromagnetic actuator 22b is set in every combustion cycle (four strokes) or at every output of the reference signal from the crankangle sensor 26, output torque and engine speed in the respective cylinders 12a are made generally the same, thereby promoting stable drivability during idling operation.

Figure 7:
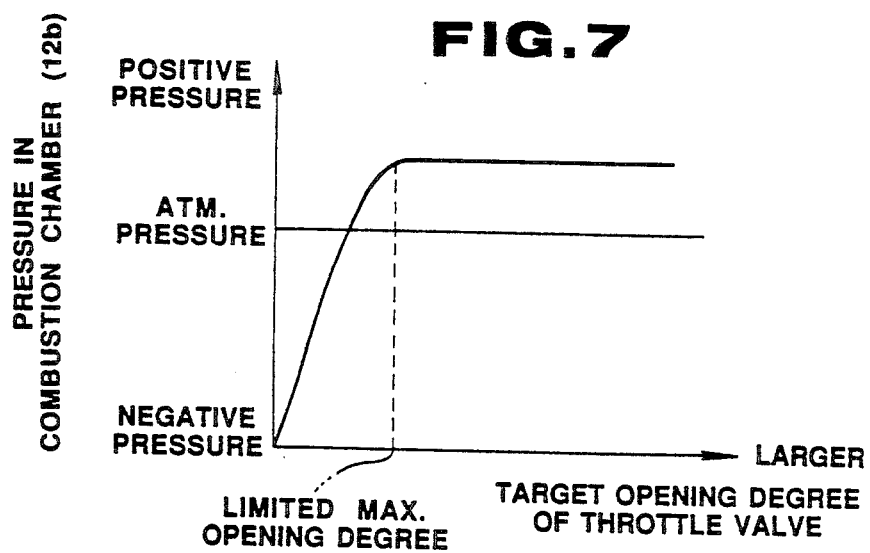
FIG. 7 is a graph showing an effect of the intake air control system of FIG. 2 in terms of intake air pressure and a target opening degree of the throttle valve.
Figure 8:
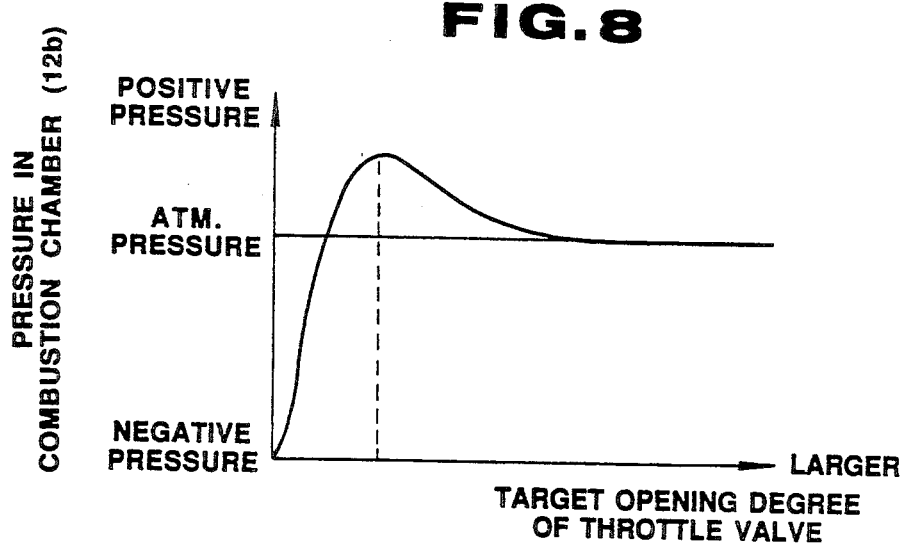
FIG. 8 is a graph similar to FIG. 7 but showing disadvantages of a comparative example which is not within the scope of the present invention.

Moreover, the maximum opening degree of the throttle valve 18 is restricted to the limited maximum opening degree (at which the combustion chamber pressure becomes the maximum when the intake valve is closing) regardless of the depression angle of the accelerator pedal 30. This suppresses the reverse flow of intake air through the throttle valve 18 after the timing of the bottom dead center of the piston 12c. As a result, the combustion chamber pressure (i.e., the intake air amount sucked in the combustion chamber) can be maintained at a high level (over the level of atmospheric pressure) at the limited maximum opening degree of the throttle valve 18 as shown in FIG. 7, thereby preventing output torque lowering at a large opening degree of the throttle valve 18.

In this connection, if such a control of the throttle valve 18 is not carried out, the following difficulties will be encountered in the engine in which the closing timing of the intake valve is set after the bottom dead center of the piston: After the bottom dead center of the piston, the combustion chamber pressure increases as the combustion chamber volume decreases, so that the combustion chamber volume becomes equal to the intake air amount sucked in the combustion chamber thereby rendering the combustion chamber pressure equal to the level of atmospheric pressure. Thereafter, the combustion chamber pressure increases over the level of atmospheric pressure with a decrease of the combustion chamber, in which the intake air in the combustion chamber reversely flows through the intake valve into the intake air passage until the time at which the intake valve is closed. Then, in the case that the opening degree of the throttle valve 18 is large, the intake air from the combustion chamber further reversely flows through the throttle valve. As a result, the combustion chamber pressure (i.e., the intake air amount in the combustion chamber) cannot be maintained at the high level as compared with that (shown in FIG. 7) of the above-discussed embodiment.

While the above embodiment has been shown and described as being arranged to control the bypass valve 22a on the basis of an output torque (in the respective cylinders) predicted from the pressures in the respective combustion chambers, it will be understood that the bypass valve may be controlled on the basis of intake pressure, intake air flow amount, air-fuel ratio of mixture supplied to each engine cylinder and/or actual output torque in each engine cylinder. The air-fuel ratio may be predicted from a signal representative of oxygen concentration in exhaust gas, output from an oxygen sensor (not shown).

Although the bypass valve has been shown and described as being disposed in the bypass passage, it will be appreciated that it may be disposed in a communication passage connecting the intake air passage downstream of the throttle valve and a tank in which air is stored under pressure.

What is claimed is:

1. An intake air control system for an internal combustion engine, comprising:
a plurality of intake air passages which are respectively communicable with a plurality of combustion chambers each defined in an engine cylinder of the engine, intake air flowing through each intake air passage to be supplied to the corresponding combustion chamber;

a plurality of first control valves each of which is movably disposed in each intake air passage to control a flow amount of intake air in each intake air passage;

means defining a plurality of communication passages each of which is connected with said intake air passage upstream of the corresponding first control valve, air flowing through the corresponding communication passage being supplied to each intake air passage;

a plurality of second control valves each of which is disposed in each communication passage to control a flow amount of air flowing in each communication passage;

means for controllably operating each second control valve in accordance with at least one engine operating parameter in connection with the corresponding cylinder;

means for detecting an engine speed of the engine;

means for setting a limited maximum opening degree of each first control valve in accordance with the detected engine speed at which degree a pressure in the corresponding combustion chamber is approximately the maximum at a timing before an expansion stroke in the corresponding cylinder; and means for restricting a maximum value of opening degree of each first control valve in accordance with said limited maximum opening degree.

2. An intake air control system as claimed in claim 1, wherein said limited maximum opening degree setting means includes means for setting said limited maximum opening degree of each first control valve in accordance with the detected engine speed at which degree the pressure in the corresponding combustion chamber is approximately the maximum when an intake valve of the corresponding cylinder is closing.

3. An intake air control system as claimed in claim 1, wherein said second control valve operating means includes means for controllably operating each second control valve in accordance with an engine operating parameter representative of output torque in the corresponding cylinder.

4. An intake air control system as claimed in claim 2, wherein said engine operating parameter is a pressure in the corresponding combustion chamber.

5. An intake air control system as claimed in claim 1, further comprising means for controllably operating each second control valve in a manner that the flow amount of air through the corresponding communication passage during a time from closing to opening of an intake valve in the corresponding cylinder is larger than that during a time from opening to closing of the intake valve.

6. An intake air control system as claimed in claim 1, further comprising means for controllably operating each second control valve in a manner to be fully opened when an intake valve in the corresponding cylinder is closing and to be closed to a predetermined opening degree immediately before the intake valve opens.

7. An intake air control system as claimed in claim 1, further comprising means for setting a target opening degree of the first control valve in accordance with a depression amount of an accelerator pedal.

8. An intake air control system as claimed in claim 7, further comprising means for operating each first control valve in accordance with said target opening degree, said maximum value of opening degree forming part of said target opening degree.

9. An intake air control system as claimed in claim 8, wherein said opening degree maximum value restricting means includes means for setting said maximum value of said target opening degree at said limited maximum opening degree.

10. An intake air control system as claimed in claim 1, wherein a volume of each intake air passage defined between said first control valve and an intake valve is not larger than ½ of a maximum volume of the combustion chamber.

* * * * *